US007419119B2

(12) United States Patent
Horita

(10) Patent No.: US 7,419,119 B2
(45) Date of Patent: Sep. 2, 2008

(54) TAPE REEL FOR MAGNETIC TAPE CARTRIDGE

(75) Inventor: Takashi Horita, Osaka-fu (JP)

(73) Assignee: Hitachi Maxell, Ltd., Osaka-fu (JP)

( * ) Notice: Subject to any disclaimer, the term of this patent is extended or adjusted under 35 U.S.C. 154(b) by 491 days.

(21) Appl. No.: 11/080,646

(22) Filed: Mar. 16, 2005

(65) Prior Publication Data

US 2005/0205714 A1 Sep. 22, 2005

(30) Foreign Application Priority Data

Mar. 17, 2004 (JP) ............................ 2004-075742

(51) Int. Cl.
*B65H 75/14* (2006.01)

(52) U.S. Cl. .................................................. 242/610.6

(58) Field of Classification Search ................. 242/343, 242/345, 348, 348.2, 610.6, 611; 360/132
See application file for complete search history.

(56) References Cited

U.S. PATENT DOCUMENTS 6,913,218 B2 * 7/2005 Ishihara .................. 242/345.2
2005/0145737 A1 * 7/2005 Iino .......................... 242/348

FOREIGN PATENT DOCUMENTS

| | | | |
|---|---|---|---|
| JP | 7-161167 | A | 6/1995 |
| JP | 11-238352 | A | 8/1999 |
| JP | 2002-269711 | A | 9/2002 |
| JP | 2002-367331 | A | 12/2002 |

* cited by examiner

*Primary Examiner*—John Q. Nguyen
(74) *Attorney, Agent, or Firm*—Birch, Stewart, Kolasch & Birch, LLP

(57) ABSTRACT

A tape reel includes a reel body which has a lower flange and a bottomed tubular hub formed integrally with the lower flange and opening at its upper end. An upper flange is mounted on the upper end of the hub. A plurality of locking teeth engageable with a reel retainer and a plurality of driving teeth engageable with a driving shaft of a tape drive are, respectively, formed circumferentially on upper and lower surfaces of an outer peripheral edge portion of a bottom wall of the hub so as to project therefrom. On the lower surface of the bottom wall of the hub, a gate position for injection molding is provided at a position corresponding to that for forming the locking teeth.

4 Claims, 6 Drawing Sheets

10
2
11
22
19
32
G
G
32
12
32
13

TAPE REEL FOR MAGNETIC TAPE CARTRIDGE

BACKGROUND OF THE INVENTION

1. Field of the Invention

The present invention generally relates to tape reels for magnetic tape cartridges and more particularly, to a tape reel suitable for use in a single-reel type magnetic tape cartridge in which a single tape reel is received in a cartridge casing.

2. Description of the Prior Art

A tape reel is constituted by a reel body in which a bottomed tubular hub opening at its upper end and a lower flange are formed integrally, and an upper flange mounted on the upper end of the hub. On upper and lower surfaces of an outer peripheral edge portion of a bottom wall of the hub, a plurality of locking teeth engageable with a reel retainer and a plurality of driving teeth engageable with a driving shaft of a tape drive are, respectively, formed circumferentially so as to project therefrom. A tape reel of this type is known from, for example, Japanese Patent Laid-Open Publication No. 11-238352 (1999) referred to as “a prior art document 1”.

Such reel body is usually obtained by injection molding molten resin from a gate position provided at a center on the upper surface of the bottom wall of the hub. Regarding molding of the reel body, several proposals for devising the gate position, fluidity of the molten resin, etc. have been advanced. For example, a technique in which the gate position is provided at an inner peripheral edge portion on a lower surface of the lower flange for the purpose of shortening a molding cycle and facilitating mold release is proposed in Japanese Patent Laid-Open Publication No. 7-161167 (1995) referred to as “a prior art document 2”, while another technique in which fluidity of the resin in a cavity is improved so as to eliminate defective molding is proposed in Japanese Patent Laid-Open Publication No. 2002-367331 referred to as “a prior art document 3”. Meanwhile, in the above prior art document 2, a reel body is formed by a lower flange and a bottomed tubular hub opening downwardly. On the other hand, in the above prior art document 3, a locking member for locking a reel body is subjected to molding.

Several kinds of single-reel type magnetic tape cartridges are used as data backup mediums for office computers. In response to the recent trend to larger capacity of hard disks subjected to backup, there is a demand for not only higher recording density of the magnetic tape cartridge of this kind but higher read rate and write rate of recording signals. In order to raise recording density of the recording signals, wavelength of the recording signals is further shortened and the track pitch is set to be narrower. In order to ensure and speed up signal recording in a tape system in which recording density of the recording signals is raised in this way, Japanese Patent Laid-Open Publication No. 2002-269711 referred to as “a prior art document 4” proposes a servo track system in which servo signals are preliminarily recorded on a magnetic tape such that positional control of a magnetic head array is performed precisely on the basis of the servo signals. In this known servo track system in which read and write are performed at higher density and at higher rate than other conventional tape systems, it is essential due to the narrow track pitch to accurately position the magnetic tape relative to the magnetic head. Thus, reliability of read and write of the signals is greatly affected by scatter of shape and dimensions of the tape reel and stable running of the magnetic tape naturally. For example, a rotational plane of the tape reel tilts periodically at the time of read and write of the signals due to defective shape of the tape reel. Alternatively, if there is nonuniformity in rotational balance, error of read and write may happen. In other words, in this known servo track system, molding accuracy of the tape reel, which has offered substantially no problem in other conventional tape systems may cause such defects as off-track or the like and thus, will constitute one of deciding factors in attaining far higher read rate and write rate in the future.

As described above, in a reel body, the bottomed tubular hub opening at its upper end and, the lower flange are formed integrally. When thicknesses of respective portions of the reel body are compared with each other, the bottom wall of the hub fundamentally has a thickness of 1.2 mm, while an overall thickness of the bottom wall of the hub at its portion formed with the locking teeth reaches 4.5 mm which is a little less than four times the thickness of the bottom wall of the hub. Meanwhile, it is theoretically considered that a speed (time) at which the molten resin sets is proportional to a square of the thickness. According to this consideration, the period required for setting of the portion of the bottom wall of the hub, which is formed with the locking teeth, is about 14 times the period required for setting of the bottom wall of the hub. This difference in setting time may form a cause leading to production of sink marks, i.e., shrinkage recesses due to setting, thereby resulting in scatter of flatness or roundness.

In order to avoid such molding defects as sink marks when an item having thick portions scattered to several locations as described above is molded, a molding technique is known in which even after injected molten resin has been filled into a cavity, a predetermined injection pressure is maintained continuously such that the molten resin is supplemented in response to shrinkage of the volume upon its setting. However, in the method in which the reel body is molded by providing the gate position at the center on the upper surface of the bottom wall of the hub, even if molding is performed while the resin is being supplemented, it is impossible to effectively eliminate sink marks occurring at the locations for forming the locking teeth and the driving teeth as well as other molding defects, so that it is difficult to obtain the tape reel having high molding accuracy.

The locking teeth and the driving teeth, which are formed more thickly than other portions of the tape reel as described above, are continuous with the gate position via the bottom wall of the hub, which is as thin as 1.2 mm. Hence, even if the predetermined injection pressure is maintained after filling of the molten resin, a portion of the bottom wall of the hub, which is disposed inside the locking teeth, sets prior to setting of the locking teeth and the driving teeth and thus, supplement of the resin upon shrinkage of the volume cannot be performed sufficiently at the thick portions. If the locking teeth or the driving teeth cannot be molded at high shape accuracy, it is impossible to avoid deterioration of cylindricalness of the hub and planar distortion degree of the lower flange and thus, it is difficult to obtain the tape reel suitable for the servo track system. Especially, in case molding accuracy of the driving teeth engageable with the driving shaft of the tape drive is low, the magnetic tape cannot be supplied stably, thereby resulting in an obstacle to higher read rate and write rate.

SUMMARY OF THE INVENTION

Accordingly, an essential object of the present invention is to provide, with a view to eliminating the above mentioned drawbacks of prior art, a tape reel which includes a reel body molded at high precision so as to be suitable for use in a servo track system for performing read and write at high density and at high rate.

In order to accomplish this object of the present invention, a tape reel of the present invention includes a reel body which has a lower flange and a bottomed tubular hub formed integrally with the lower flange and opening at its upper end. An upper flange is mounted on the upper end of the hub. A plurality of locking teeth engageable with a reel retainer and a plurality of driving teeth engageable with a driving shaft of a tape drive are, respectively, formed circumferentially on upper and lower surfaces of an outer peripheral edge portion of a bottom wall of the hub so as to project therefrom. On the lower surface of the bottom wall of the hub, a gate position for injection molding is provided at a position corresponding to that for forming the locking teeth.

In accordance with the present invention, even if a bottom wall of a hub has the locking teeth and the driving teeth thicker than other portions, these thick portions can be molded at high precision and thus, the tape reel can supply a magnetic tape stably in the servo track system for performing read and write at high density and at high rate.

BRIEF DESCRIPTION OF THE DRAWINGS

This object and features of the present invention will become apparent from the following description taken in conjunction with the preferred embodiments thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
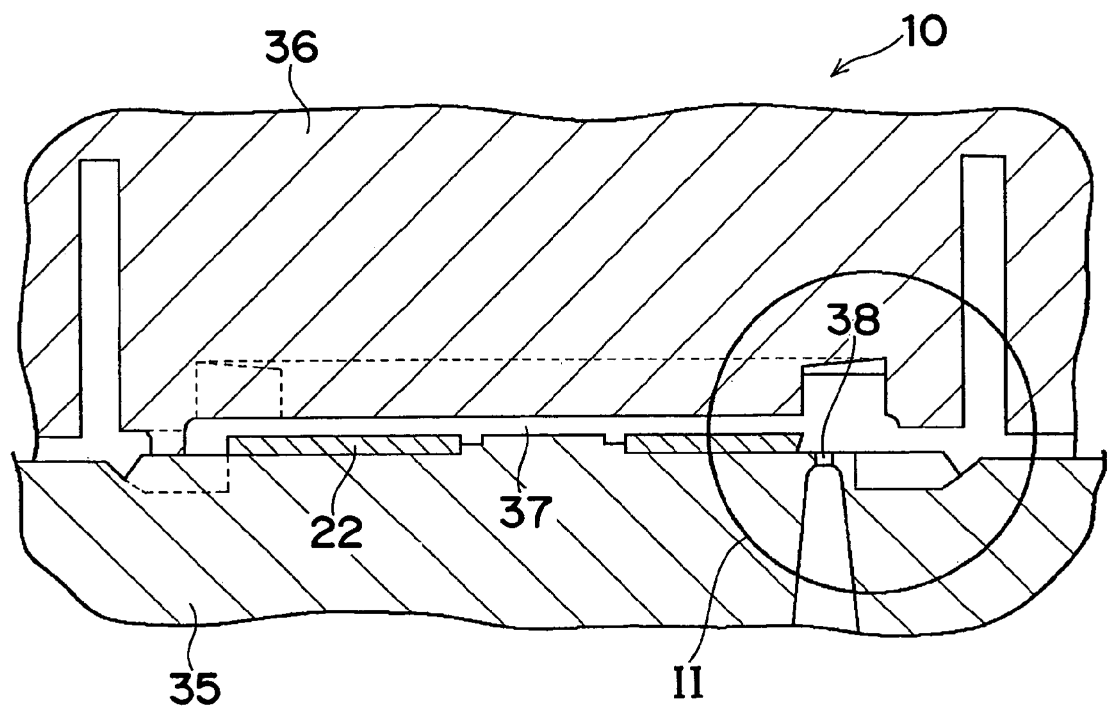
FIG. 1 is a fragmentary sectional view of a molding die for a reel body of a tape reel according to a first embodiment of the present invention.

Hereinafter, embodiments of the present invention are described with reference to the drawings.

First Embodiment

FIGS. 1 to 6 show a tape reel 2 according to a first embodiment of the present invention. The tape reel 2 is applied to, for example, a single-reel type magnetic tape cartridge C shown in FIG. 3 so as to take up a magnetic tape 3. The magnetic tape cartridge C includes a rectangular boxlike cartridge casing 1 in which the single tape reel 2 having the magnetic tape 3 wound therearound is received. A supply end of the magnetic tape 3 is coupled with a loading pin 4 for drawing out the magnetic tape 3. The loading pin 4 is disposed inwardly of a tape draw-out mouth 5 opening at a front corner portion of the cartridge casing 1. Upper and lower ends of the loading pin 4 are positioned and held by a pair of holders provided on upper and lower portions of the cartridge casing 1, respectively. The tape draw-out mouth 5 is supported so as to be slidingly opened or closed and is closed by a shutter 6 which is urged by a spring to close the tape draw-out mouth 5.

Figure 4:
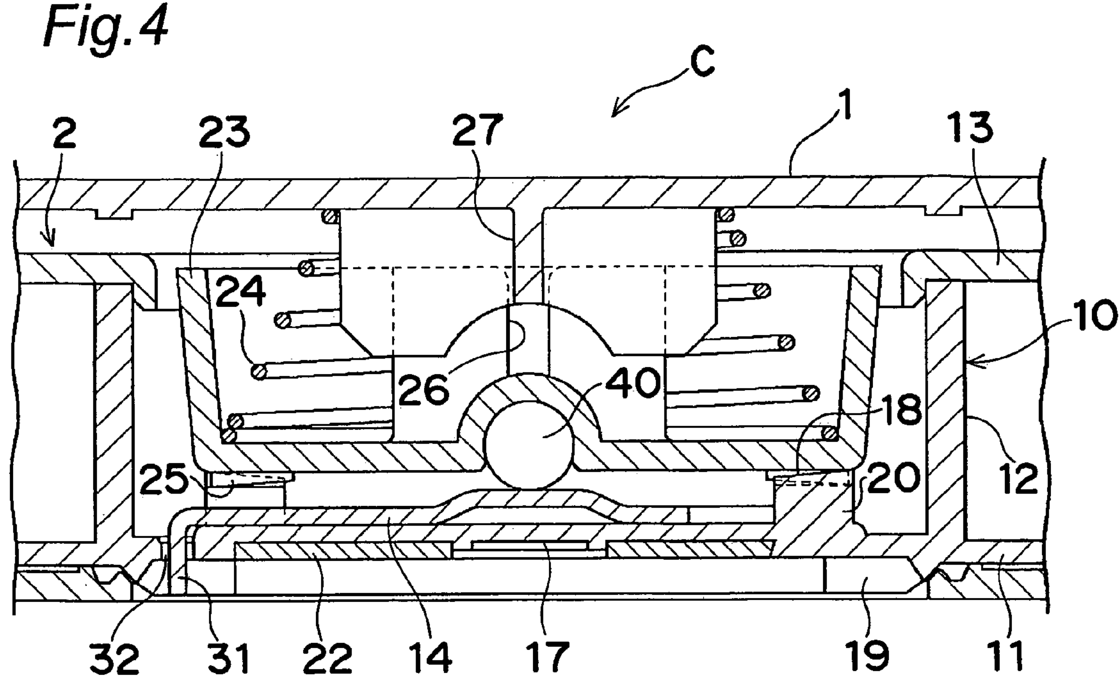
FIG. 4 is a vertical sectional view of a vicinity of a hub of the tape reel of FIG. 1.
Figure 5:
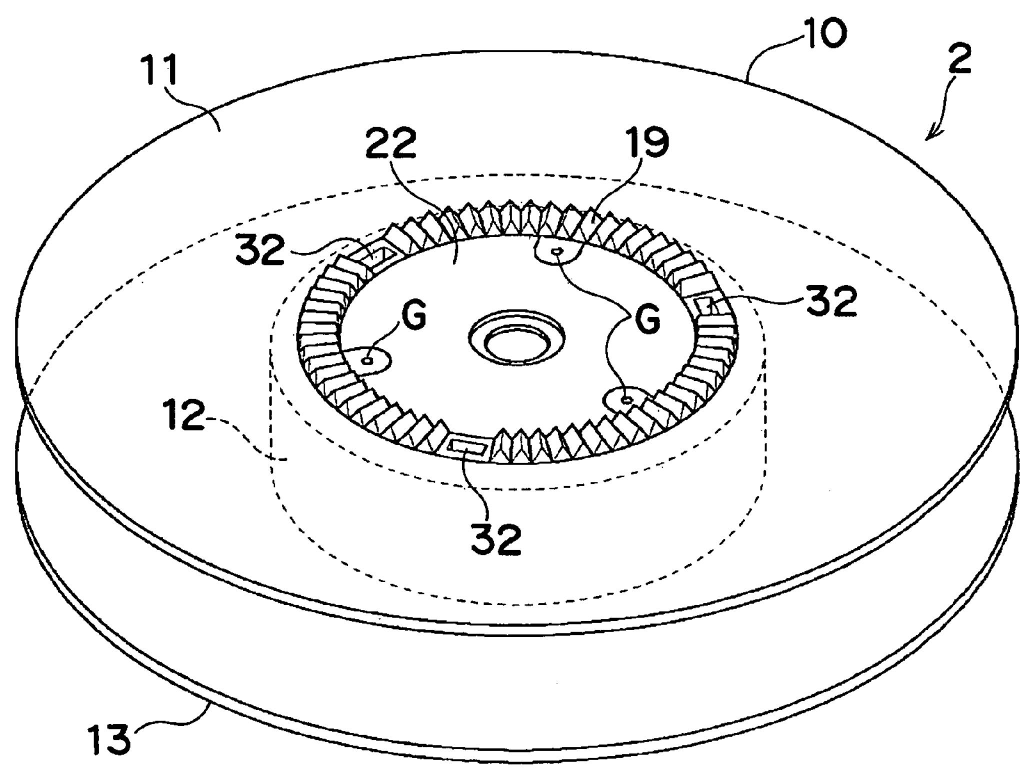
FIG. 5 is a perspective view of a bottom portion of the tape reel of FIG. 1.

In FIGS. 4 and 5, the tape reel 2 is constituted by a reel body 10 and an upper flange 13. The reel body 10 further includes a lower flange 11 and a bottomed tubular hub 12 formed integrally with the lower flange 11 and opening at its upper end, while the upper flange 13 is fusion bonded to the upper end of the hub 12. In order to prevent idle rotation of the tape reel 2 at the time the tape reel 2 is not in use, a reel locking mechanism including a lock releasing member 14 is provided between the reel body 10 and an upper wall of the cartridge casing 1.

As shown in FIGS. 4 and 5, a plurality of locking teeth 18 engageable with a reel retainer 23 to be described later and a plurality of driving teeth 19 engageable with a driving shaft of a tape drive are, respectively, formed circumferentially on upper and lower surfaces of a whole outer peripheral edge portion of a bottom wall 17 of the hub 12 so as to project therefrom. The locking teeth 18 are formed on an upper end of an annular boss 20 projecting from the upper surface of the bottom wall 17 of the hub 12 and are interrupted at three circumferential locations thereof such that three legs 31 of the lock releasing member 14 are exposed to the lower surface of the bottom wall 17 of the hub 12. An attraction plate 22 is secured to the lower surface of the bottom wall 17 of the hub 12 so as to be attracted by a magnet (not shown) provided on the driving shaft. The driving teeth 19 are disposed so as to surround an outer periphery of the attraction plate 22. In the same manner as the locking teeth 18, the driving teeth 19 are also interrupted at three circumferential locations thereof. Each of the locking teeth 18 and the driving teeth 19 is formed by a radially extending gear tooth having an triangular cross section. As shown in FIG. 5, an annular region surrounding the attraction plate 22 is recessed in a U-shape at its three circumferential locations, which correspond to three gate positions G, respectively.

Figure 3:
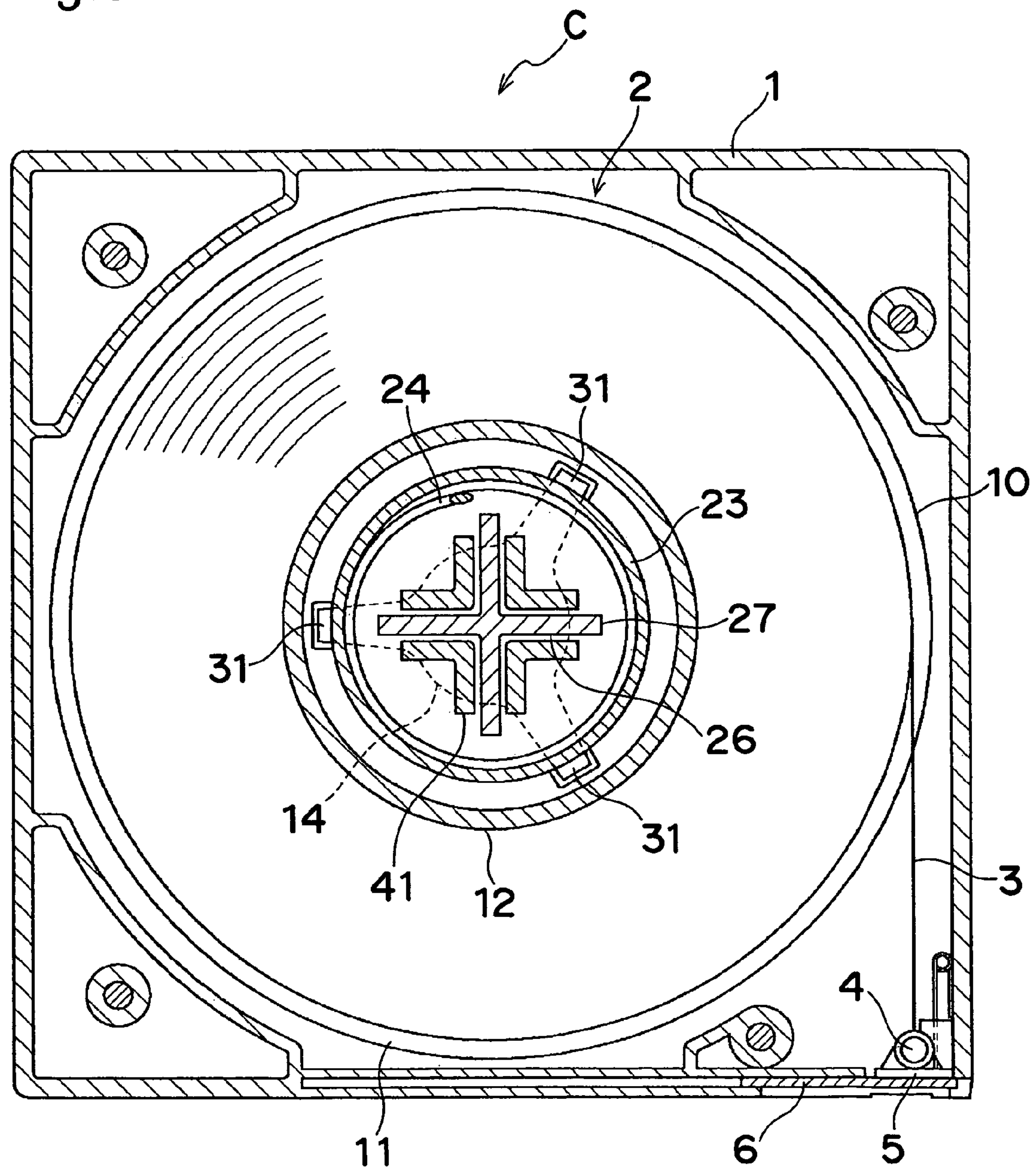
FIG. 3 is a horizontal sectional view of a magnetic tape cartridge including the tape reel of FIG. 1.

In FIG. 4, the reel locking mechanism includes the reel retainer 23 for nonrotably holding the tape reel 2 upon its engagement with the tape reel 2, a spring 24 for urging the reel retainer 23 downwardly towards the locking teeth 18 and the lock releasing member 14 for releasing engagement between the reel retainer 23 and the locking teeth 18. The reel retainer 23 is formed by a plastic molded item having a shape of a circular dish opening upwardly. A ball 40 is received by a recess formed at a center of a lower surface of a bottom wall of the reel retainer 23 so as to be supported by the lock releasing member 14, while mating teeth 25 engageable with the locking teeth 18 are integrally formed at an outer peripheral edge portion of the lower surface of the bottom wall of the reel retainer 23. As shown in FIG. 3, four L-shaped ribs 41 are formed on an inner face of the reel retainer 23 so as to define a cruciform groove 26 therebetween. A cruciform guide bracket 27 is provided on a lower surface of an upper wall of the cartridge casing 1 so as to be brought into guiding engagement with the cruciform groove 26 of the reel retainer 23. Thus, the reel retainer 23 is nonrotably but vertically movably supported by the guide bracket 27 of the cartridge casing 1.

The lock releasing member 14 is obtained by pressing a stainless steel sheet. Three arms 30 extend radially from a central portion of the lock releasing member 14 at an identical circumferential interval and each of the legs 31 is bent downwardly from a distal end of each of the arms 30. Since each of the legs 31 is exposed to the lower surface of the bottom wall 17 of the hub 12 via each of three openings 32 formed at the interrupted circumferential locations of the locking teeth 18 as shown in FIG. 5, the legs 31 can be projected into the interrupted circumferential locations of the driving teeth 19. When the driving teeth 19 are brought into engagement with the driving shaft of the tape drive, the tape reel 2 as a whole is pushed upwardly against the urging force of the spring 24 and thus, is released away from a bottom face of the cartridge casing 1. Since the legs 31 are further thrust upwardly by mating teeth of the driving shaft, the mating teeth 25 of the reel retainer 23 and the locking teeth 18 of the reel body 10 are brought out of engagement with each other, so that the tape reel 2 can be rotated so as to supply or take up the magnetic tape 3.

Figure 2:
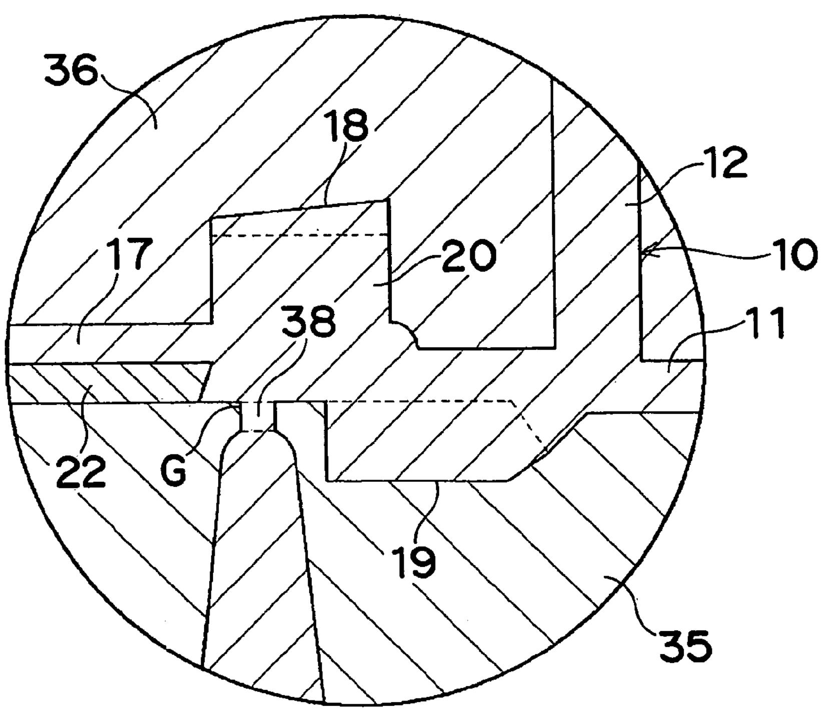
FIG. 2 is an enlarged detail view of a portion 11 in FIG. 1.

In the present invention, in order to attain higher density of recording signals on the magnetic tape 3 and higher read rate and write rate, the reel body 10 of the above described arrangement is injection molded as follows so as to obtain the tape reel 2 having high molding accuracy in shapes and finish dimensions. In FIGS. 1 and 2, a molding die is constituted by a stationary die 35 and a movable die 36. Molten resin is injected into a molding cavity 37 formed between the stationary die 35 and the movable die 36 so as to mold the reel body 10. The injection molding of the present invention has such a feature that the gate positions G are provided on the lower surface of the bottom wall 17 of the hub 12 so as to correspond, in position, to the locking teeth 18.

Figure 6:
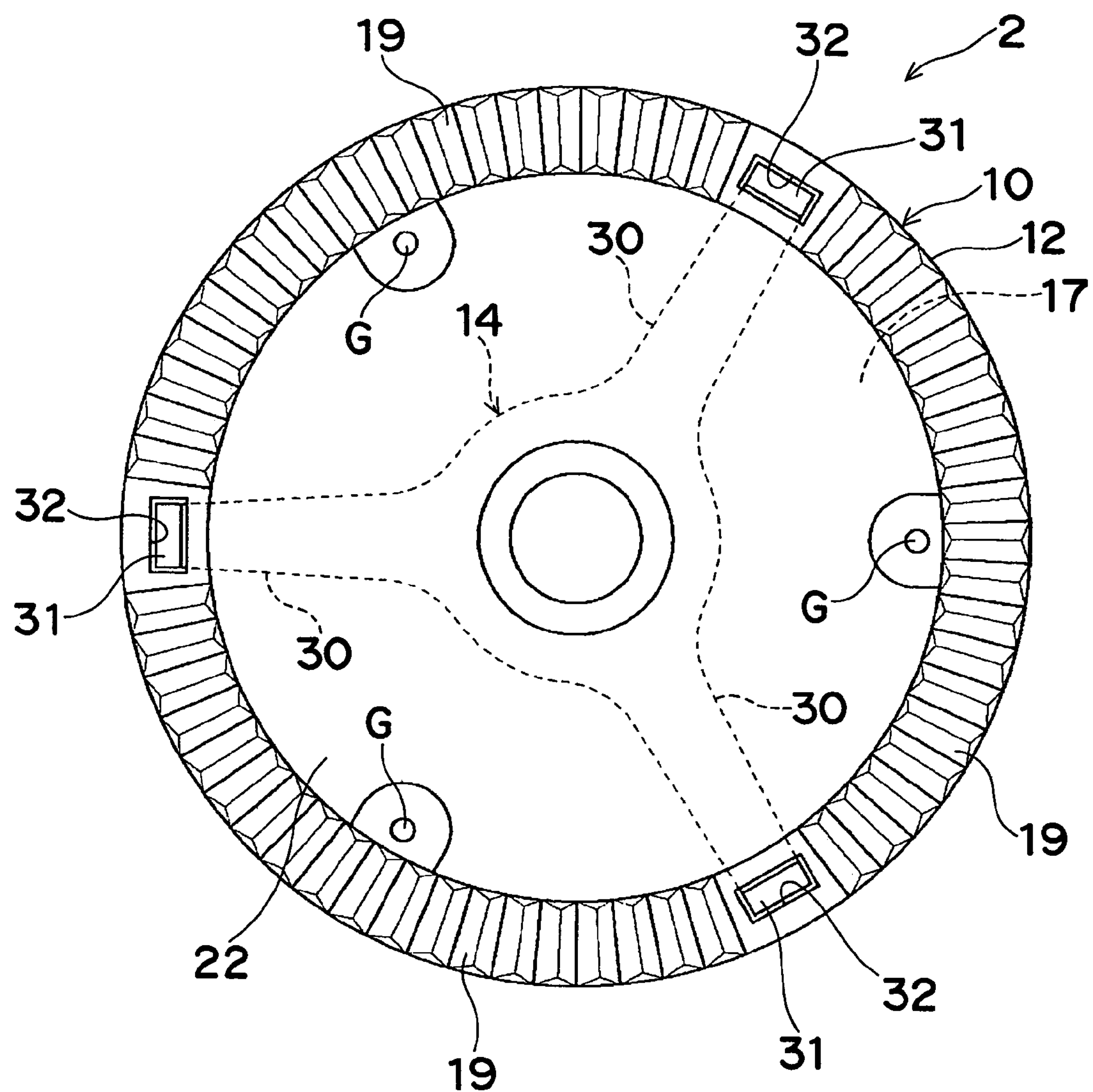
FIG. 6 is a bottom plan view of a bottom wall of the hub of FIG. 4.

More specifically, as shown in FIGS. 1 and 2, a gate 38 is provided on the lower surface of the bottom wall 17 of the hub 12 so as to be disposed at a radially inner portion of the boss 20. Furthermore, as shown in FIG. 6, the gate 38, i.e., the gate position G is provided at three locations on the lower surface of the bottom wall 17 of the hub 12 at an identical circumferential interval. By this arrangement of the gate positions G, since flow of the molten resin to the locking teeth 18 and the driving teeth 19 is made more uniform and secure, structural parts of the tape reel 2 can be formed at higher shape accuracy. At the time of molding, after the movable die 36 has been bonded to the stationary die 35, the movable die 36 and the stationary die 35 are clamped to each other. Then, the molten resin is injected from the gates 38 into the molding cavity 37 through runners. Even after the molding cavity 37 has been filled with the injected molten resin, a predetermined injection pressure is maintained continuously such that the molten resin can be supplemented in response to shrinkage of its volume upon its setting.

Setting of the molten resin starts concurrently with completion of filling of the molten resin into the molding cavity 37. However, the gates 38 are provided at the positions corresponding to those of the locking teeth 18 and the thick boss 20. Thus, even after a thin-walled portion, for example, the bottom wall 17 of the hub 12 has been set, setting of the boss 20 is not completed. Therefore, a portion of the resin in the molding cavity 37, which is used for forming the boss 20, is partially in a molten state but starts setting at its side held in contact with the stationary die 35 and the movable die 36. Accordingly, if the predetermined injection pressure is applied to the gates 38 continuously, the molten resin can be supplemented in response to shrinkage of its volume upon its setting. As a result, it is possible to obtain high molding accuracy in shapes and finish dimensions of respective portions of the reel body 10, not to mention the locking teeth 18 and the driving teeth 19. Since there is no sink mark or defective molding due to setting shrinkage of thick-walled portions of the reel body 10, it is possible to obtain highly accurate cylindricalness of the hub 12 and minimize planar distortion degree of the lower flange 11 acting as a reference face for taking up the magnetic tape 3. Consequently, the tape reel 2 of the present invention is suitable for use in a servo track system for performing read and write at high density and at high rate.

Second Embodiment

Figure 7:
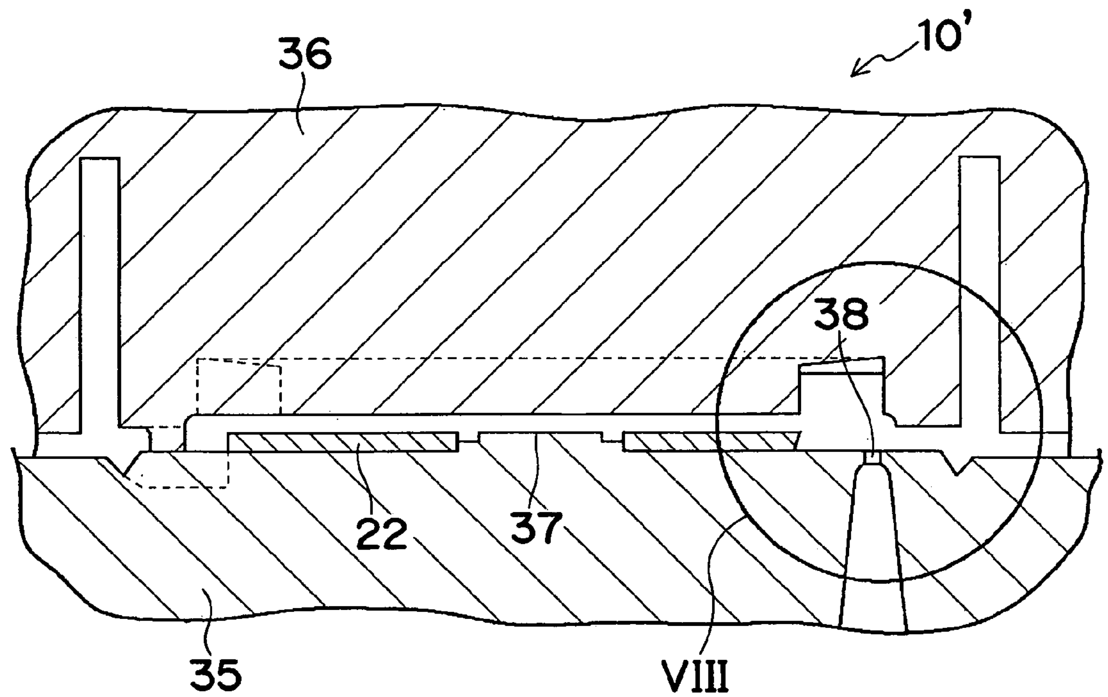
FIG. 7 is a fragmentary sectional view of a molding die for a reel body of a tape reel according to a second embodiment of the present invention.
Figure 8:
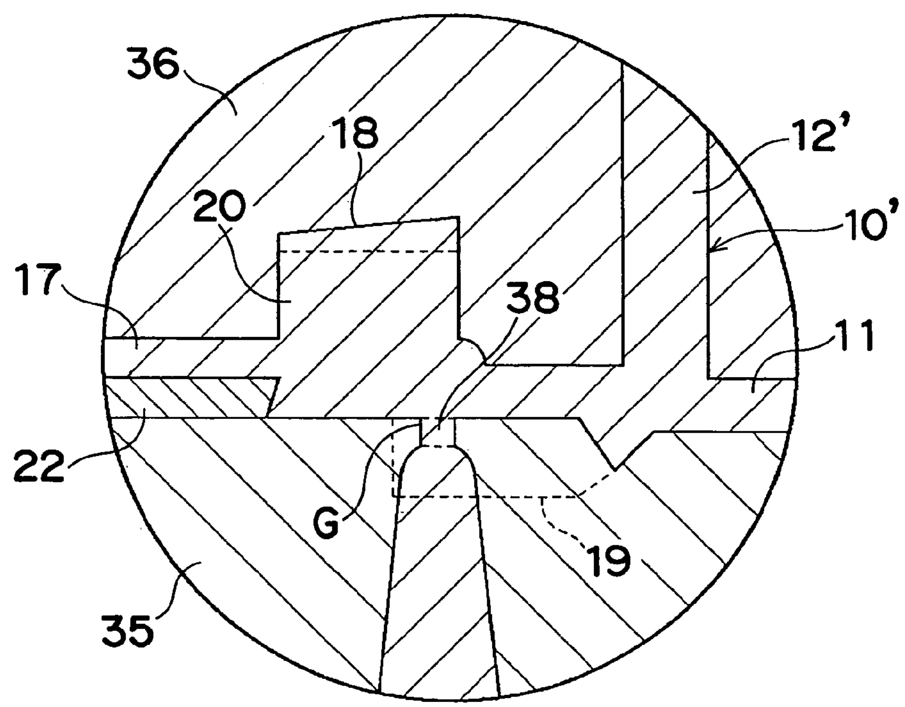
FIG. 8 is an enlarged detail view of a portion VII in FIG. 7.
Figure 9:
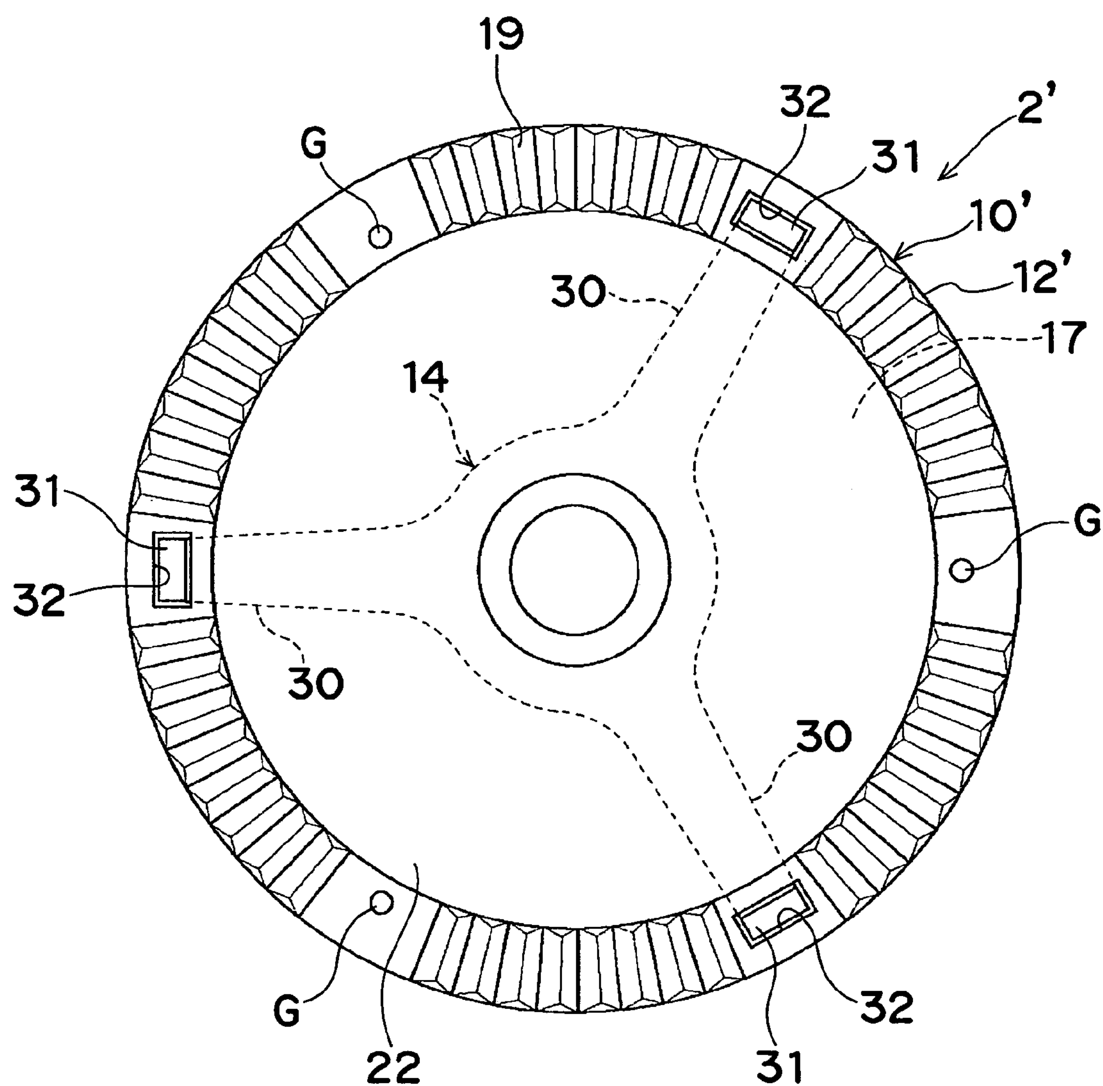
FIG. 9 is a bottom plan view of a bottom wall of a hub of the tape reel of FIG. 7.

FIGS. 7 to 9 show a hub 12' of a reel body 10' in a tape reel 2' according to a second embodiment of the present invention. As shown in FIG. 9, the gate positions G of the hub 12' are changed from those of the hub 12 in the tape reel 2 of the first embodiment. As shown in FIG. 8, an outer peripheral contour of the locking teeth 18 is disposed between an inner peripheral contour and an outer peripheral contour of the driving teeth 19 such that the locking teeth 18 and the driving teeth 19 overlap each other in a radial direction in the same manner as the first embodiment. However, in this embodiment, the gate positions G are provided in an overlap region between the inner peripheral contour of the driving teeth 19 and the outer peripheral contour of the locking teeth 18 on the lower surface of the bottom wall 17 of the hub 12' in contrast with the first embodiment. Namely, as shown in FIG. 9, the gate positions G are provided at three interrupted circumferential locations of the driving teeth 19 such that the molten resin supplemented in response to its setting shrinkage can easily flow to both of the boss 20 and the driving teeth 19.

In the first and second embodiments, the gate positions G may be provided at a plurality of other locations on the lower surface of the bottom wall 17 of the hub 12 than those corresponding to the locking teeth 18 in the first embodiment and those corresponding to the driving teeth 19 in the second embodiment.

Furthermore, the locking teeth 18 may also be formed directly on the upper surface of the bottom wall 17 of the hub 12 without the boss 20 in the same manner as the driving teeth 19.

What is claimed is:

1. A tape reel comprising:

a reel body which includes a lower flange and a bottomed tubular hub formed integrally with the lower flange and opening at its upper end;

an upper flange which is mounted on the upper end of the hub; and a plurality of locking teeth engageable with a reel retainer and a plurality of driving teeth engageable with a driving shaft of a tape drive, which are, respectively, formed circumferentially on upper and lower surfaces of an outer peripheral edge portion of a bottom wall of the hub so as to project therefrom;

wherein on the lower surface of the bottom wall of the hub, a gate position for injection molding is provided at a position corresponding, in a radial direction of the hub, to that for forming the locking teeth, wherein an inner peripheral contour of the driving teeth is disposed between an inner peripheral contour and an outer peripheral contour of the locking teeth such that the locking teeth and the driving teeth overlap each other in a radial direction of the hub, and wherein the gate position is provided between the inner peripheral contour of the driving teeth and the inner peripheral contour of the locking teeth.

2. The tape reel as claimed in claim 1, wherein a plurality of the gate positions are, respectively, provided at a plurality of locations at an identical circumferential interval.

3. The tape reel as claimed in claim 2, wherein the locking teeth are formed on an annular boss projecting from the upper surface of the bottom wall of the hub.

4. The tape reel as claimed in claim 1, wherein the locking teeth are formed on an annular boss projecting from the upper surface of the bottom wall of the hub.

* * * * *